Oct. 18, 1966   J. KORN   3,280,261
CONTROL DEVICE FOR THE STEP-WISE, PILOT CONTROLLED
LEVEL REGULATION OF COMMUNICATION SYSTEMS
Filed July 27, 1962   2 Sheets-Sheet 1

INVENTOR
Joel Korn
BY George A. Spencer
ATTORNEY

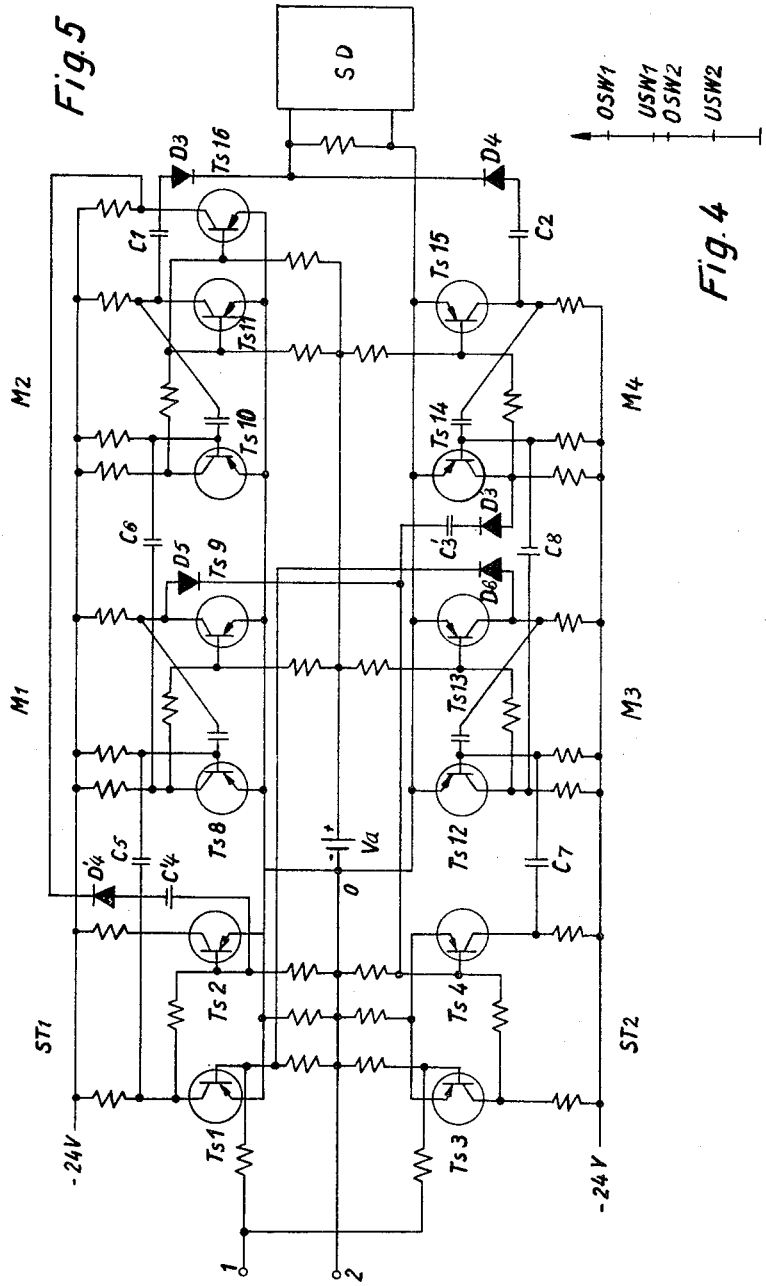

United States Patent Office 3,280,261
Patented Oct. 18, 1966

3,280,261
CONTROL DEVICE FOR THE STEP-WISE, PILOT CONTROLLED LEVEL REGULATION OF COMMUNICATION SYSTEMS
Joel Korn, Backnang, Wurttemberg, Germany, assignor to Telefunken Patentverwertungs-G.m.b.H., Ulm (Danube), Germany
Filed July 27, 1962, Ser. No. 212,891
Claims priority, application Germany, Aug. 1, 1961, T 20,523; Aug. 10, 1961, T 20,580
11 Claims. (Cl. 179—15)

The present invention relates generally to carrier frequency multichannel long distance communication systems, and, more particularly, to a method of, and apparatus for, providing stepwise pilot controlled level regulation.

In carrier frequency technology, stepwise pilot-controlled level regulation has been used to an increasing extent. The reason for this is that in stepwise regulation there is an advantage over continuous regulation in that with many regulators are connected with each other in series in a long carrier frequency transmission path, transient responses with sudden changes or jumps in level can be more easily controlled.

In a known device for the stepwise regulation of the level, the received, amplified, and rectified, pilot voltage is scanned, examined, or evaluated by a voltage discriminator. This discriminator must determine the corresponding stepwise switching direction or stepping direction which is needed upon the occurrence of an underlevel or an overlevel, which means a level which is below or a level which is above a normal or reference level. The stepping direction mentioned above is the stepping direction of a stepping device, such as a digital electronic setting device or a stepping switch motor. The discriminator also opens a connecting or switching device by means of which a freely oscillating pulse generator, such as an astable multivibrator or a blocking oscillator, may deliver stepping pulses to the setting device. The setting device controls a regulating element such as a thermistor, and supplies it with a stepwise regulatable current.

In the type of regulating process described above, the discriminator and the pulse generator operate independently of each other. Accordingly, the instant of reversal of the stepping direction of the setting device may be separated from a subsequent timing pulse by the duration of a full pulse, and the setting of the device may not change until the next timing pulse occurs, in spite of the reversal of the stepping direction. Because of this, poorly converging transient responses having relatively large overshot occur when there is a steep change in level, in those cases where long connections with many regulators are provided.

With these defects of the prior art in mind, it is a main object of the present invention to provide a device of the character described which avoids and eliminates the above-mentioned disadvantages.

Another object of this invention is to provide a method of and apparatus for regulating a setting device wherein there is a substantially immediate response to a change in the stepping direction.

A further object of the invention is to provide a method of and apparatus for regulating a setting device wherein provision is made for eliminating undesirable overregulation and the occurrence of regulating oscillations, and which also provides permissible level variations as small as desired.

Still a further object of the present invention is to provide a method of and apparatus for controlling a setting device wherein short and preferably differentiated flyback pulses are provided shortly before a stepping pulse occurs.

These objects and other ancillary thereto are accomplished according to preferred embodiments of the invention wherein the received, amplified and rectified pilot voltage is evaluated by a voltage discriminator responsive to the occurrence of an underlevel or overlevel to determine the stepping direction of a setting device which is stepped by means of stepping pulses from a pulse generator. The pulse generator is so coupled with the discriminator that the pulse generator is released only when the discriminator is responding. Also, after a predetermined small delay period, subsequent to setting the stepping direction of the setting device, a first timing pulse occurs which changes the setting device immediately by one step in the desired direction and subsequent stepping pulses follow in accordance with the timing frequency until the discriminator again is placed into its rest condition. The small period of delay is required in order to assure proper presetting of the setting device without error into the desired stepping direction.

By means of the regulation of the present invention, that is, the method and the apparatus therefor, a good and proper converging transient response is provided even though many regulators are connected in series, and the length of the system is practically unlimited.

When the setting member or members which are to be controlled by the setting device are inert such as thermistors, there is an additional advantage in that a regulating step in a direction which very shortly thereafter proves to be undesirable practically does not change the setting member as the step is immediately corrected.

Additional objects and advantages of the present invention will become apparent upon consideration of the following description when taken in conjunction with the accompanying drawings in which:

FIGURE 4 is a graphical view illustrating the threshold values which are to be considered in conjunction with the present invention.

FIGURE 5 is a circuit diagram of another embodiment of the instant invention.

Figure 1:
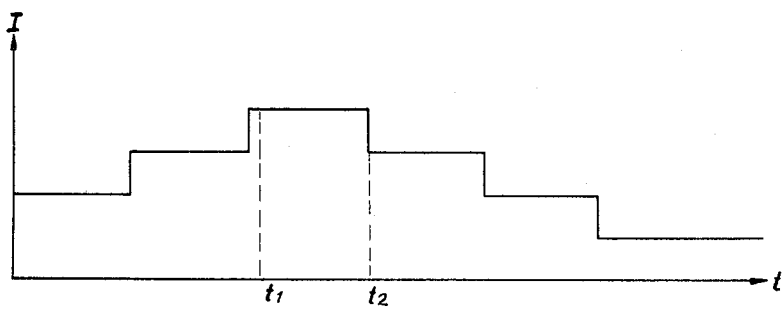
FIGURE 1 is a graphical view illustrating the stepping current of a prior art device.

With more particular reference to the drawings, FIGURE 1 illustrates the regulating process in the known type of stepwise regulation and shows the regulating current $I$ plotted against the time $t$. This current may be, for example, the heating current of an indirectly heated thermistor, which is delivered by the setting device to the controlled member. If, at a certain level, the discriminator is adjusted so that the regulating current increases, this occurs stepwise in equal time intervals. If, at the time $t1$, a jump in level occurs which would require a decrease of the regulating current, an entire pulse duration will first occur until, at the instant $t2$, the regulating current decreases by one step. Thus, the controlled member is first influenced in the wrong manner and will be corrected only after a relatively long period of time.

Figure 2:
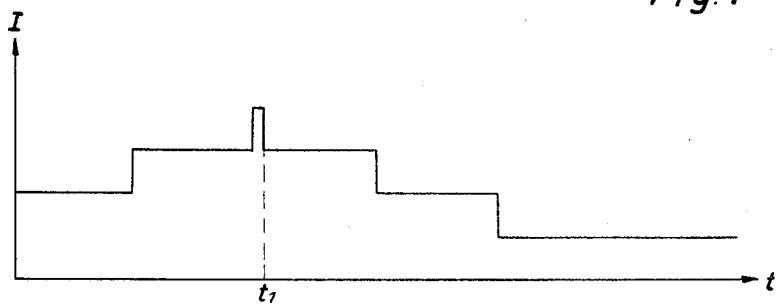
FIGURE 2 is a graphical view similar to FIGURE 1 illustrating the stepping current of the present invention.

FIGURE 2 shows the regulating process in the type of stepwise regulation according to the present invention. In this type of regulation if a jump in level occurs at instant $t1$ which requires a decrease in the regulating current, the regulating current is corrected by one step substantially immediately.

Figure 3:
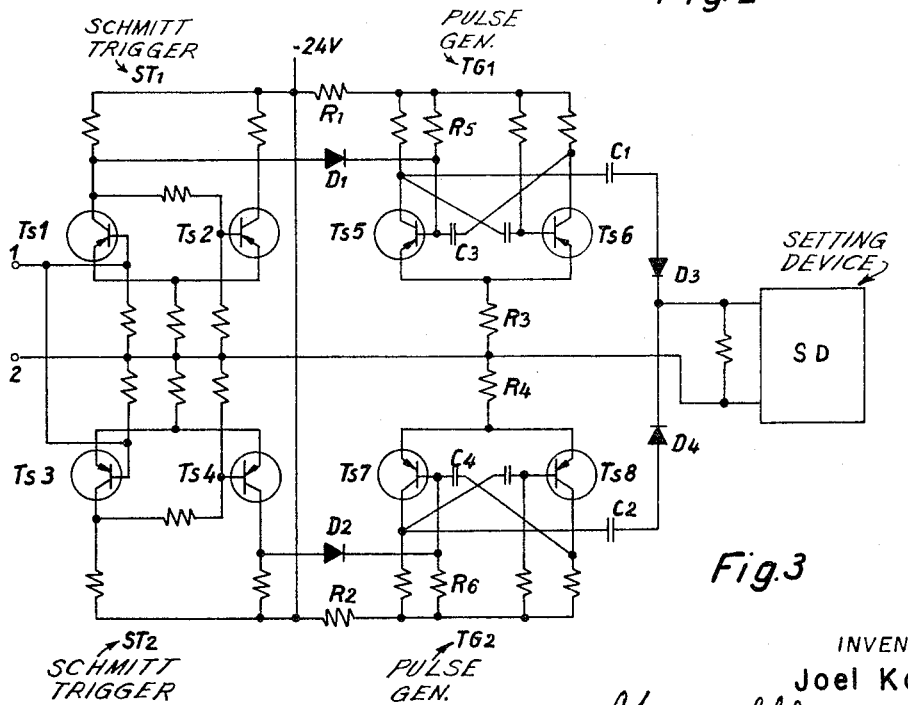
FIGURE 3 is a circuit diagram of one embodiment of the instant invention.

FIGURE 3 illustrates one embodiment of the present invention. The pilot voltage applied to terminals 1, 2, which has already been amplified and rectified, arrives at the input of a voltage discriminator for underlevels and overlevels. This discriminator includes two transistorized Schmitt triggers ST1 and ST2, known per se. Each of these Schmitt triggers is provided with two transistors Ts1, Ts2, and Ts3, Ts4, respectively. Two pulse generators TG1 and TG2 of similar construction are also provided and these include symmetrical, astable multivibrators which are known per se, and one having two transistors Ts5 and Ts6, and the other having transistors Ts7 and Ts8. The operating voltage of the pulse generators is smaller (—12 volts) than the operating voltage of the Schmitt triggers (—24 volts) and resistors R1 and R2 produce the required voltage drop. The timing pulses from the pulse generators TG1 and TG2 are differentiated via capacitors C1 and C2 and are applied to the input of an electronic setting device SD via decoupling diodes D3 and D4. Such a setting device is described, for example, in German Patent No. 1,118,831. A germanium diode D1 is disposed between the collector of the transistor Ts1 and the base of the transistor Ts5, and a germanium diode D2 is connected between the collector of the transistor Ts4 and the base of the transistor Ts7.

At normal level, the transistors Ts1 and Ts4 are conducting and the transistors Ts2 and Ts3 are blocked. The collectors of transistors Ts1 and Ts4 thus are at low potential and maintain the bases of transistors Ts5 and Ts7 also at this low potential via diodes D1 and D2 which are thereby conductive. The common emitter resistors R3 and R4 of the astable multivibrators are of such values that their voltage drop is larger than the collector voltages of the conducting transistors Ts1 and Ts4. Thus, the base terminals of the transistors Ts5 and Ts7 are more positive than their emitter terminals, and these transistors remain blocked. The pulse generators cannot oscillate, and the setting device SD remains in its rest condition.

At underlevels, the transistors Ts1 is blocked, the Schmitt trigger ST1 responds, and the setting device is placed into the desired stepping direction. The cathode of the diode D1 lies at the blocking potential of the transistor Ts1 (—24 volts). The anode of diode D1 has a lower potenital, and diode D1 is blocking. The pulse generator TG1 thus is separated from the Schmitt trigger ST1 and can oscillate. At the collector of transistor Ts5 the first positive pulse is produced as soon as its base voltage becomes more negative than its emitter voltage. The coupling capacitor C3 is substantially not charged and thus a predetermined period of time passes until the left plate of the capacitor assumes the potential necessary for making the transistor Ts5 conductive via resistor R5. Because of this, the first positive pulse is delivered to the setting device after a predetermined small delay, after the Schmitt trigger ST1 has responded. This delay may be determined by suitably choosing the values of circuit components, for example, by suitably choosing values for the resistors R3 and R4. The first positive pulse thus appears at the setting device SD substantially immediately, while the subsequent pulses follow in accordance with the timing frequency.

At overlevels, the transistors Ts4 is blocked, and the further processes take place correspondingly, as described above. The diode D2 separates the pulse generator TG2 from the Schmitt trigger ST2, and this pulse generator delivers the first stepping pulse to the setting device after a small delay which is determined by the charging of the capacitor C4 via the resistor R6, after the Schmitt trigger ST2 has set the setting device SD into the desired stepping direction.

Assume that at first a lower level was present at the input terminals 1, 2, and that the pulse generator TG1 just delivered a stepping pulse to the setting device SD. Now, if a jump in level occurs at the input terminals, so that an over-level is present, the Schmitt trigger ST1 immediately holds the pulse generator TG1 via diode D1, the Schmitt trigger ST2 responds, and releases the pulse generator TG2 in the manner described above. This pulse generator TG2 delivers a pulse to the setting device, after a small delay period and after the Schmitt trigger ST2 has reversed the stepping direction of the setting device, and corrects the setting of the setting device immediately by one regulating step.

The circuit according to FIGURE 3 may also be considered and arranged so that the Schmitt trigger ST1 responds to over-levels, and the Schmitt trigger ST2 responds to underlevels. Then, their threshold values are arranged as indicated in FIGURE 4. The first Schmitt trigger responds to overlevels if the pilot voltage exceeds the upper threshold value OSW1 of this trigger and it is in rest condition, or arrives at its rest condition, if the voltage falls below its lower threshold value USW1. The second Schmitt trigger responds to underlevels if the voltage falls below the lower threshold value USW2 of this Schmitt trigger, and is in rest condition or arrives at its rest condition, if the voltage exceeds its upper threshold value OSW2.

If the first Schmitt trigger has responded, regulating steps are continuously produced for lowering the level in synchronism with the pulse generator pulses until the lower threshold value USW1 of the first Schmitt trigger is reached. If the second Schmitt trigger has responded, regulating steps are continuously produced for elevating the level until the upper threshold value OSW2 of the second Schmitt trigger is reached.

However, there is a problem in that when using a Schmitt trigger the distance between threshold values cannot be made as small as desired in the case of small, permissible variations in level, the inner threshold values USW1 and OSW2 must come very close to each other, or overlap each other. However, in this event there are the disadvantages that the regulating steps must be smaller than the respective distances of the two upper or the two lower threshold values, for otherwise undesirable overregulation and regulating oscillations may occur, and the permissible level variations cannot be made as small as desired and thus the quality of the regulation is limited.

In order to avoid these disadvantages, the pulse generator is additionally coupled with the voltage discriminator, made up of transistorized Schmitt triggers, in such a manner that shortly before a stepping pulse occurs, short and preferably differentiated pulses (flyback pulses) are supplied to the suitable base terminals of the Schmitt triggers by the pulse generator and these pulses return the triggers to their rest condition.

If there is still an overlevel or underlevel present, after the flyback pulses have vanished, the corresponding Schmitt trigger responds again and the expected stepping pulse may arrive at the setting device. However, as soon as the level lies within the permissible level variation limited by the threshold values OSW1 and USW2, neither of the Schmitt triggers responds after the flyback pulse has passed, and all further regulating pulses thus are prevented from occurring until an overlevel or underlevel again arises. The threshold values USW1 and OSW2 may overlap or may also be out of the permissible level tolerance range because, with the aid of the flyback pulses, they are what may be considered as suppressed. In this manner, there is the additional advantage that no attention need be paid to the distance between the threshold values of the individual Schmitt triggers and thus adjusting operations are saved.

The flyback pulse is always applied to the base of the respective second transistor of the Schmitt trigger so that it influences only the respective desired Schmitt trigger. If the flyback pulse were applied to the base of the first transistor, it would also be capable of arriving at the input of the other Schmitt trigger, which input is connected in parallel.

FIGURE 5 is an embodiment of a circuit operating with flyback pulses.

The amplified and rectified pilot voltage applied to terminals 1, 2, arrives at the input of the two Schmitt triggers ST1 and ST2. Each of the two Schmitt triggers is provided with a pulse generator respectively including two transistorized monostable multivibrators M1, M2, and M3, M4, which are known per se. The multivibrator M1 contains two transistors Ts8 and Ts9. The multivibrator M2 has two transistors Ts10 and Ts11. The multivibrator M3 has two transistors Ts12 and Ts13. The multivibrator M4 possesses two transistors Ts14 and Ts15. A switching transistor Ts16 is provided which serves for phase reversal and for making the pulse steeper. This switching transistor is controlled by multivibrator M2.

The multivibrators M1 to M4 are in rest condition when the transistors Ts8, Ts10, Ts12, and Ts14 are conducting, and they are in excited condition when the transistors Ts9, Ts11, Ts13, and Ts15 are conducting. The switching transistor Ts16 is blocked in its rest condition. The multivibrators M1 and M3 have a very short pulse duration, while in distinction thereto, the multivibrators M2 and M4 have a much longer pulse duration, so that two strongly asymmetrical pulse generators are provided.

The pulses emanating from the two pulse generators are differentiated via capacitors C1 and C2 and are delivered to the input of the electronic setting device SD via the decoupling diodes D3 and D4. A capacitor C5 is provided between the collector of transistor Ts1 and the base of transistor Ts8. A capacitor C6 is provided between the collector of the transistor Ts8 and the base of transistor Ts10. A capacitor C7 is provided between the collector transistor Ts14 and the base of transistor Ts12. A capacitor C8 is provided between the collector of transistor Ts12 and the base of transistor Ts14.

Diode D5 is provided between the collector of the transistor Ts9 and the base of transistor Ts4, and a diode D6 is disposed between the collector of transistor Ts13 and the base of transistor Ts1. A series circuit of a capacitor C'3 and a diode D'3 is connected between the collector of the transistor Ts14 and the base of transistor Ts4, while between the collector of transistor Ts16 and the base of transistor Ts2, there is a series circuit of a capacitor C'4 and a diode D'4.

The base terminals of the transistors of multivibrators M1 to M4 which are blocked in the rest condition, as well as the base of the phase reversing transistor Ts16, are at a positive potential by means of a small auxiliary voltage Va, so that the thermal stability of the multivibrators and of the switching transistor is assured, and only the residual voltage lies between the collectors of the conducting transistors of the multivibrators and the reference potential O.

At normal level, the transistors Ts2 and Ts3 are conducting and the transistors Ts1 and Ts4 are blocked. The multivibrators M1 to M4 are not excited, and no stepping pulses arrive at the setting device SD.

At overlevel, transistor Ts1 becomes conductive and transistor Ts2 is blocked. A differentiated, positive pulse arrives at the base of transistor Ts8 via capacitor C5, and the multivibrator M1 is excited and thereby the transistor Ts8 is blocked and the transistor Ts9 becomes conductive. At the termination of its pulse duration, the multivibrator again returns into its rest condition and excites the multivibrator M2 via capacitor C6 and at once delivers a stepping pulse to the setting device. At the end of the pulse duration of the vultivibrator M2, it returns to its rest condition and delivers a differentiated, negative flyback pulse to the base of transistor Ts2 via transistor Ts16 and the diode D'4 and the capacitor C'4 so that transistor Ts2 becomes conductive and the transistor Ts1 is blocked. Thus the Schmitt trigger ST1 returns to its rest condition.

If there is still an overlevel present after cessation of the flyback pulse, Schmitt trigger ST1 again responds and the process repeats itself. However, if no overlevel is present any longer after cessation of the flyback pulse because of the regulating process, the Schmitt trigger ST1 remains in its rest condition, and no further stepping pulses are delivered to the setting device.

At underlevel, the transistor Ts3 is blocked and the transistor Ts4 becomes conductive. A differentiated, positive pulse arrives at the base of transistor Ts12, via capacitor C7, and the multivibrator M3 is excited so that transistor Ts12 is blocked and the transistor Ts13 becomes conductive. At the end of the duration of its pulse, the multivibrator M3 returns to its rest condition and excites the multivibrator M4, via capacitor C8. This multivibrator M4 at once delivers a stepping pulse to the setting device SD. At the end of the duration of the pulse of multivibrator M4, it returns to the rest condition and applies a differentiated, positive flyback pulse to the base of transistor Ts4 via diode D'3 and capacitor C'3 so that transistor Ts4 is blocked and transistor Ts3 becomes conductive. Thus, the Schmitt trigger ST2 assumes its rest condition.

If, after the flyback pulse has decayed, there is still an underlevel present, the Schmitt trigger ST2 again responds and the process is repeated. However, if, because of the regulation operation, no underlevel is present any longer after the flyback pulse has ceased, the Schmitt trigger ST2 remains in its rest condition, and no further stepping pulses are delivered to the setting device.

It shall be assumed that at first an overlevel is present at terminals 1, 2, and that shortly after the multivibrator M1 has responded a jump in level occurs so that an underlevel is ambient. In this case, the arrival of stepping pulses at the setting device simultaneously from both pulse generators must be prevented. For this purpose, the base of transmitter Ts4 is kept at the residual voltage potential of the transistor Ts9 via diode D5, and thus the Schmitt trigger ST2 is retained in rest condition, until the multivibrator M1 returns to its rest condition. Only then can the Schmitt trigger ST2 respond and trigger its pulse generator. Correspondingly, when the level jumps from underlevel to overlevel, the Schmitt trigger ST1 is kept in its rest condition by the multivibrator M3, via diode D6, until the multivibrator M3 returns to its rest condition.

It will be understood that the above description of the present invention is susceptible to various modifications, changes, and adaptations, and the same are intended to be comprehended within the meaning and range of equivalents of the appended claims.

What is claimed is:

1. In a device for the stepwise, pilot-controlled level regulation of communication transmission systems, especially for carrier frequency multichannel long distance communication systems with many regulators connected in series, in which the received, amplified, and rectified pilot voltage is evaluated by a voltage discriminator which responds to the occurrence of an underlevel or an overlevel and determines the stepping direction of a setting device which is stepped by means of stepping pulses from a pulse generator, the improvement comprising means for coupling the pulse generator with the discriminator in such a manner that the pulse generator is released only when the discriminator is responding and that after a predetermined small delay period after setting the stepping direction of the setting device, a first timing pulse occurs and changes the setting device immediately by one step in the desired direction, while the subsequent stepping pulses follow in accordance with the synchronizing frequency, until the discriminator has again attained its rest condition.

2. A method for the step wise, pilot-controlled level regulation of communication transmission systems including a voltage discriminator for evaluating a received, amplified, and rectified pilot voltage responsive to the occurrence of an underlevel or an overlevel and for determining the stepping direction of a setting device which is stepped by means of stepping pulses from a pulse generator, said method comprising the steps of:

(a) releasing the pulse generator only when the discriminator is responding;

(b) setting the stepping direction of the setting device;

(c) after a predetermined small delay after said setting, providing a first timing pulse to change the setting device immediately by one step in the desired direction; and (d) providing subsequent stepping pulses in accordance with the synchronizing frequency until the discriminator is returned to its rest condition.

3. A device for the stepwise, pilot-controlled level regulation of communication transmission systems, comprising, in combination:

(a) a setting device operable in stepwise fashion by stepping pulses;

(b) voltage discriminator means connected to said setting device and responsive to the occurrence of an underlevel and an overlevel for determining the stepping direction of said setting device; and (c) at least one pulse generator means capable of forming stepping pulses and connected to said setting device for applying the first of the stepping pulses thereto with a predetermined small delay period after the stepping direction has been set by said discriminator means and for applying subsequent stepping pulses thereto in accordance with a timing frequency until said discriminator means is returned to its rest condition, said generator being coupled to said discriminator means and being operable only when said discriminator means is responding.

4. A device for the step-wise, pilot-controlled level regulation of communication transmission systems, comprising, in combination:

(a) a setting device operable in step-wise fashion by stepping pulses;

(b) a voltage discriminator connected to said setting device and responsive to the occurrence of an underlevel and an overlevel for determining the stepping direction of said setting device; and (c) at least one pulse generator capable of forming stepping pulses and connected to said setting device for applying the first of the stepping pulses thereto with a predetermined small delay period after the stepping direction has been set by said discriminator and for applying subsequent stepping pulses thereto in accordance with a timing frequency until said discriminator is returned to its rest condition, said generator being coupled to said discriminator and being operable only when said discriminator is responding, there being two separate pulse generators, said discriminator including two Schmitt triggers coupled with said two separate pulse generators by diodes and arranged so that when an underlevel occurs, one of the pulse generators is released for operation, and when an overlevel occurs, the other pulse generator is released for operation after a small delay and the setting device is at once changed by one step in the desired direction, while the further stepping pulses follow in accordance with a timing frequency until the discriminator again has attained its condition of rest.

5. A device as defined in claim 4 including differentiating circuits and decoupling diodes between said setting device and said pulse generators.

6. A device as defined in claim 4 wherein said pulse generators are astable multivibrators arranged to provide the necessary delay of the first timing pulse after the release of a multivibrator without additional means, by correspondingly arranging the values of the circuit of the multivibrator.

7. A device for the step-wise, pilot-controlled level regulation of communication transmission systems, comprising, in combination:

(a) a setting device operable in step-wise fashion by stepping pulses;

(b) thermistors connected to be controlled by said setting device;

(c) a voltage discriminator connected to said setting device and responsive to the occurrence of an underlevel and an overlevel for determining the stepping direction of said setting device; and (d) at least one pulse generator capable of forming stepping pulses and connected to said setting device for applying the first of the stepping pulses thereto with a predetermined small delay period after the stepping direction has been set by said discriminator and for applying subsequent stepping pulses thereto in accordance with a timing frequency until said discriminator is returned to its rest condition, said generator being coupled to said discrmnator and being operable only when said discriminator is responding.

8. A device for the step-wise, pilot-controlled level regulation of communication transmission systems, comprising, in combination;

(a) a setting device operable in step-wise fashion by stepping pulses;

(b) a voltage discriminator connected to said setting device and responsive to the occurrence of an underlevel and an overlevel for determining the stepping direction of said setting device; and (c) at least one pulse generator capable of forming stepping pulses and connected to said setting device for applying the first of the stepping pulses thereto with a predetermined small delay period after the stepping direction has been set by said discriminator and for applying subsequent stepping pulses thereto in accordance with a timing frequency until said discriminator is returned to its rest condition, said generator being coupled to said discriminator and being operable only when said discriminator is responding, said discriminator including transistorized Schmitt triggers and further comprising additional means for coupling the pulse generator with the voltage discriminator so that shortly before the occurrence of a stepping pulse, short differentiated flyback pulses arrive at suitable base terminals of the Schmitt triggers from the pulse generator and return these into their rest condition.

9. A device as defined in claim 8 wherein said triggers each includes two transistors and the flyback pulses are always applied to the base of the second transistors of the Schmitt triggers whose first transistors are controlled by the pilot voltage.

10. A device as defined in claim 8 wherein a separate pulse generator including two monostable multivibrators is provided for each Schmitt trigger, one multivibrator of each pair having a very short pulse duration, and the other having a much longer pulse duration, said two latter multivibrators, at the end of their pulse duration, providing said differentiated flyback pulses of suitable polarity to the corresponding Schmitt trigger via a series circuit of a capacitor and a diode which corresponding Schmitt trigger, in turn, when again excited, excites the corresponding pulse generator to deliver a new timing pulse sequence.

11. A device as defined in claim 10 wherein the multivibrator for short pulse duration which is excited at that particular time maintains the Schmitt trigger designated for the opposite variation in level in its rest condition by means of a diode until the multivibrator again returns into its rest condition.

References Cited by the Examiner
UNITED STATES PATENTS

| | | | |
|---|---|---|---|
| 2,985,774 | 5/1961 | Carbone et al. | 307—88.5 |
| 3,046,543 | 7/1962 | Kaenel | 307—88.5 |
| 3,054,003 | 9/1962 | Pogano et al. | 328—140 |

DAVID G. REDINBAUGH, *Primary Examiner.*

T. G. KEOUGH, R. L. GRIFFIN, *Assistant Examiners.*